United States Patent [19]
Thomas

[11] Patent Number: 5,983,889
[45] Date of Patent: Nov. 16, 1999

[54] PORTABLE WATER TANK HEATING SYSTEM

[76] Inventor: Mark R. Thomas, 8002 Old Folsom Rd., Rapid City, S. Dak. 57703

[21] Appl. No.: 08/833,908

[22] Filed: Apr. 10, 1997

[51] Int. Cl.[6] ........................................... F24H 1/36
[52] U.S. Cl. ..................... 126/366; 126/360 R; 119/73
[58] Field of Search ................. 126/360 R, 350 R, 126/367, 366, 368, 638, 588, 373; 119/73, 91

[56] References Cited

U.S. PATENT DOCUMENTS

| | | |
|---|---|---|
| 237,689 | 2/1881 | Martin . |
| 1,521,804 | 1/1925 | Dougherty . |
| 2,126,657 | 8/1938 | Petersen . |
| 2,360,665 | 10/1944 | Fields ...................................... 126/366 |
| 2,561,932 | 7/1951 | Landgraf ............................. 126/360 R |
| 2,612,138 | 9/1952 | Lindemann . |
| 3,306,263 | 2/1967 | Johnson . |
| 3,556,199 | 1/1971 | De Groote ............................... 126/366 |
| 3,618,569 | 11/1971 | Baer . |
| 4,280,556 | 7/1981 | Cooper . |
| 4,320,720 | 3/1982 | Streed . |
| 5,138,980 | 8/1992 | Ewing . |

FOREIGN PATENT DOCUMENTS

| | | |
|---|---|---|
| 2258124 | 8/1975 | France . |
| 2469116 | 5/1981 | France . |
| 1672004 | 8/1991 | U.S.S.R. . |
| 148047 | 7/1920 | United Kingdom ................... 126/366 |

*Primary Examiner*—James C. Yeung

[57] ABSTRACT

A portable water tank heating system utilizes a continuous hollow tubular loop that contains a fluid which is circulated through the tubular loop by convection to prevent the water in a drinking tank from freezing. The system is made up of the continuous loop having an outlet line containing hot fluid under relatively higher pressure and a return line containing cold fluid under relatively lower pressure and a protective housing having hot and cold chambers for holding various components including sensors to maintain the temperature of the fluid above freezing in the system. The fluid in the continuous loop flows from a reservoir and travels past a gas burner in the hot chamber for heating the fluid. As the fluid flows through a heat exchanger in a drinking tank, the fluid releases heat to the cold water in the tank before flowing back into the housing through the return line. The fluid then returns to the reservoir to repeat the operational cycle. The housing has air inlet and exhaust ducts and baffles which allow proper air flow for the burner operation even when the system is subjected to severe inclement weather.

11 Claims, 8 Drawing Sheets

PORTABLE WATER TANK HEATING SYSTEM

BACKGROUND OF THE INVENTION

1. Field of the Invention

The present invention relates generally to water tank heating devices. More specifically, the invention relates to a portable water tank heating system which utilizes a continuous tubular loop that is filled with a fluid which is circulated through the tubular loop by convection to prevent the water in a drinking tank from freezing.

2. Description of the Prior Art

In climates where the weather becomes very cold for extended periods of time, the livestock industry encounters many problems and challenges when water in the livestock watering tanks becomes frozen, thereby preventing the livestock from having free access to water. One of the challenges is to provide a water tank heating device with an appropriately protective housing which protects the heater and components of the system even under severe weather conditions. In remote areas, electric power is often not available for powering a water tank heating device. Further, the use of electric power may be impractical or unsafe. Further, the use of solar power in geothermal units is very expensive, and such units are difficult to construct. Many different devices have been developed to deal with the problems and challenges, as exemplified by the following prior art:

U.S. Pat. No. 237,689, issued on Feb. 15, 1881, to Odile Martin, discloses an incubator that uses a gas burner to heat a fluid that circulates by convection and exchanges heat with the incubator-warming chamber to keep the incubator warm. The closed loop fluid heating system disclosed in the incubator of Martin is constructed as an internal part of the device rather than as a portable, external unit like the present invention.

U.S. Pat. No. 1,524,804, issued on May 27, 1924, to Thomas W. Dougherty, discloses a hog watering trough that heats the water circulating in a loop which is open to the trough to keep the water in the trough at a proper drinking temperature. The heating system of the watering trough of Dougherty uses an open loop and is internal to the hog waterer unlike the present invention.

U.S. Pat. No. 2,126,657, issued on Oct. 9, 1936, to Leslie T. Petersen, discloses a livestock watering tank which is heated by a gas burner and in which the water is circulating by convection. The watering tank of Petersen has neither the external heating system or the closed-loop fluid heat exchange of the present invention.

U.S. Pat. No. 2,612,138, issued on Jul. 5, 1950, to Reinhard C. Lindemann, discloses an animal watering fountain which prevents the water in a livestock watering trough from freezing. The fountain of Lindemann has neither the external heating system nor the closed-loop heating of the present invention.

U.S. Pat. No. 3,306,263 issued on Apr. 22, 1965, to Glen J. Johnson, discloses a livestock watering system which prevents the water in the trough from freezing by circulating the water in the tank with the water from a tank located underground below the frost line. The watering system of Johnson has neither the gas-powered heating system nor the closed-loop heating of the present invention.

U.S. Pat. No. 3,618,569, issued on Nov. 9, 1971, to Stephen C. Baer, discloses a device for preventing the water in a livestock watering hole from freezing which consists of a continuous loop tubing filled with a liquid which will circulate through the loop by convection and exchange heat absorbed from the bottom of the watering hole with the water on the surface of the watering hole to prevent it from freezing. The Baer device utilizes a closed loop and is portable. The device is completely submerged, however, making it difficult to use, and it relies on natural differences in temperature to cause convection rather than a gas burner which allows more heat to be exchanged into the water.

U.S. Pat. No. 4,280,556, issued on Jul. 28, 1981, to George H. Cooper, discloses a heat exchange tank assembly for a hot water heating system which utilizes a heated liquid circulating through a closed loop by convection to warm the water in a hot water tank. The closed loop heating system of the hot water heating system of Cooper relies on solar radiation rather than gas heat which does not have the limitations of solar energy.

U.S. Pat. No. 4,320,720, issued Mar. 23, 1982, to Clifford P. Streed, discloses a livestock watering system which uses geothermal energy to heat a fluid in a closed loop. The fluid is evaporated by the geothermal heat and rises through the hot half of the loop and condenses next to the waterer to transfer heat to the waterer and keep the water heated. The waterer of Streed does not disclose the external heating system according to the present invention.

U.S. Pat. No. 5,138,980, issued on Aug. 18, 1992, to Frederick D. Ewing, discloses an animal liquid feeder system which uses an electrically-operated fluid heating and cooling system to circulate a fluid in a closed loop to regulate the temperature of the liquid animal feed in the system. The closed loop temperature regulating system of the Ewing liquid feeder is electrically operated rather than gas-operated which limits the locations in which it can be used.

French Patent Document Number 2,258,124, dated Aug. 18, 1975, by Philippe Pierre Marie et al., discloses an electrically-heated livestock watering tank. Marie does not show the closed loop liquid heating system nor the gas burner of the present invention.

French Patent Document Number 2,469,116, dated May 5, 1981, by Roger Naulet, discloses a float device for preventing freezing of a livestock watering tank The device is electrically operated, unlike the present invention.

Soviet Patent Document Number 1,672,004, dated Oct. 3, 1985, by N. V. Bogomolou et al., discloses a device which uses an electrically heated fluid circulated in a closed loop which extends into a tank for heating the liquid therein. The reference does not have the gas power heating device of the present invention.

None of the above inventions and patents, taken either singularly or in combination, is seen to describe the instant invention as claimed.

SUMMARY OF THE INVENTION

The present invention relates to a portable water tank heating system which utilizes a continuous hollow tubular loop that contains a fluid which is circulated through the tubular loop by convection to prevent the water in a livestock watering or drinking tank from freeze-up under unusually low temperature conditions. The system is comprised by the continuous loop having an outlet line with hot fluid under relatively higher pressure and return line with cold fluid under relatively lower pressure and a protective housing having hot and cold chambers for holding various components of the system. The fluid in the continuous loop flows from a reservoir and travels past a gas burner in the hot chamber for heating the fluid. The fluid then travels past a gas separator in the hot chamber where trapped gas bubbles in the outlet line are removed. The fluid then travels to a heat exchanger in a drinking tank. As the fluid flows through the heat exchanger, the fluid releases heat to the cold water in the tank before flowing back into the housing through the return line. A temperature sensor associated with the return line in the cold chamber activates the burner when the fluid returning from the heat exchanger becomes too cold to prevent the water in the drinking tank from freezing. The fluid then returns to a fluid reservoir to repeat the operational cycle. An expansion tube/vapor condenser unit which is located above the fluid reservoir is adapted to hold any overflow fluid from the reservoir and also to condense fluid trapped in any gas or vapor bubbles. The housing has air inlet and exhaust ducts and baffles which allow proper air flow for the burner operation even when the system is subjected to severe inclement weather.

Accordingly, it is a principal object of the invention to provide a portable water tank heating system which is capable of preventing water from freezing in a drinking tank during sub-freezing environmental temperature conditions and is capable of maintaining operation during severe weather conditions, especially high wind conditions.

It is another object of the invention to provide a portable water tank heating system which utilizes a heated fluid circulating through a closed loop by convection to keep water in a drinking tank from freeze-up under low temperature conditions.

It is another object of the invention to provide a portable water tank heating system of which a major portion is located outside of a drinking tank and is thus resistant to the effects of corrosion of the system housing and accidental extinguishment of the heat source by the water in the tank.

It is a further object of the invention to provide a portable water tank heating system which can be easily moved from one location to another for use with a variety of different livestock drinking tanks as needed, and also permits storage of the portable water tank heating system away from the drinking tank location when the system is not needed.

Still another object of the invention is to provide a portable water tank heating system which provides quick and easy access to components thereof for starting operation of the system in severe weather conditions.

It is an object of the invention to provide improved elements and arrangements thereof in an apparatus for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

The invention will be better understood and objects other than those set forth above will become apparent when consideration is given to the following detailed description thereof. Such description makes reference to the annexed drawings wherein.

Similar reference characters denote corresponding features consistently throughout the attached drawing.

DETAILED DESCRIPTION OF THE PREFERRED EMBODIMENTS

The present invention is a portable water tank heating system which utilizes a gas burner to heat a fluid for circulating through a closed continuous loop by convection to maintain the temperature of the water in a drinking tank above freezing. As was noted in the above discussion of the prior art, it is difficult to use electrical heaters and the like in livestock watering systems located in remote geographical areas. The protective housing for the gas heater and the associated plumbing and hardware for the portable water tank heating system of the present invention enables livestock to have reliable access to a supply of drinking water, such as may be provided in a livestock drinking tank, even under extreme cold weather conditions in remote locations.

Figure 1:
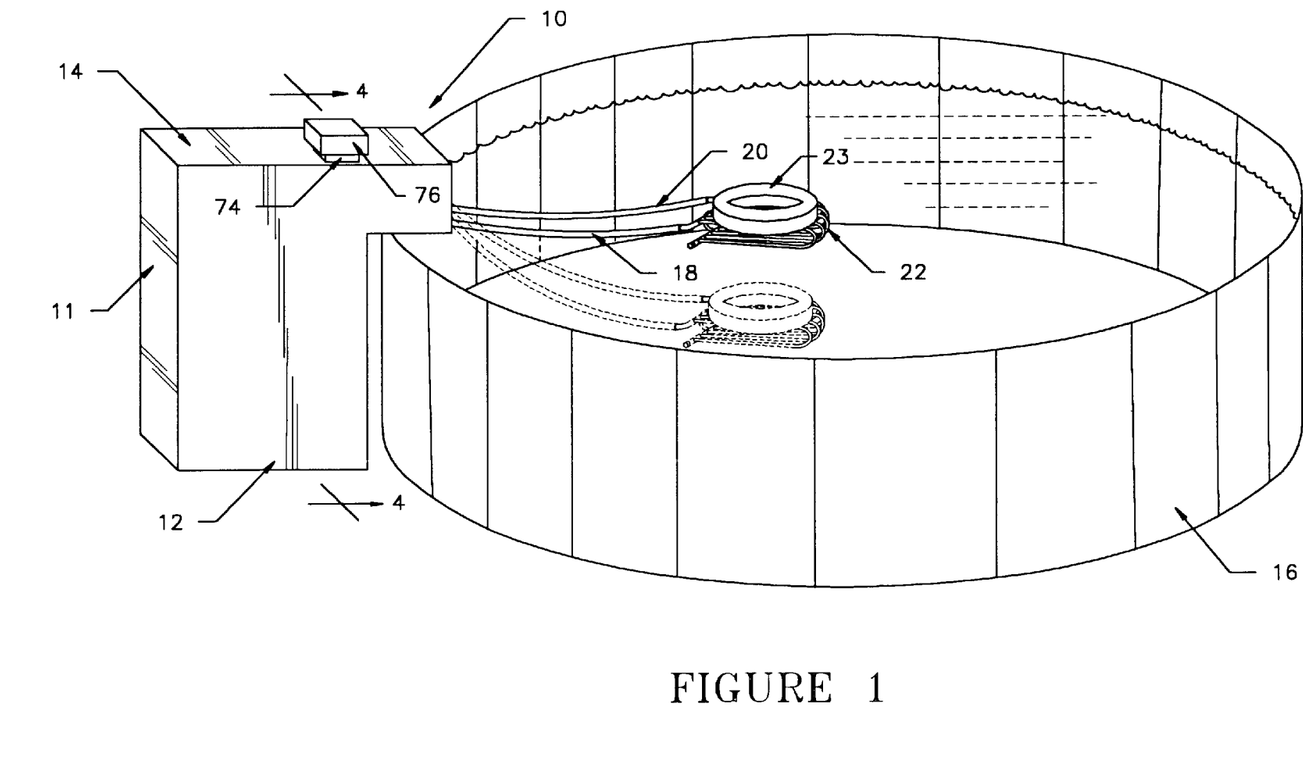
FIG. 1 is a schematic environmental perspective view of the portable water tank heating system of the present invention, particularly illustrating the system in an operating relationship to a livestock drinking tank.

Broadly stated, the system 10, as shown in FIG. 1, includes a protective housing 11 that has a hot chamber 12 and a cold chamber 14 which are oriented in a side-by-side relationship to each other in the interior of the housing 11. The protective housing 11 is preferably portable so that it can be placed adjacent to a livestock watering or drinking tank 16. The hot 12 and cold 14 chambers are operatively connected via a hot outlet line 18 and a cold return line 20, respectively, to a heat exchanger 22 which is inserted into the drinking tank 16. The heat exchanger 22 may be positioned near the surface of the water through the use of a float 23 attached to the heat exchanger 22 (as shown in solid and broken lines in FIG. 1). Optionally, the float 23 may be omitted so that the heat exchanger 22 rests at or near the bottom of the tank 16 (as shown in FIG. 1) in a completely immersed condition.

Figure 2:
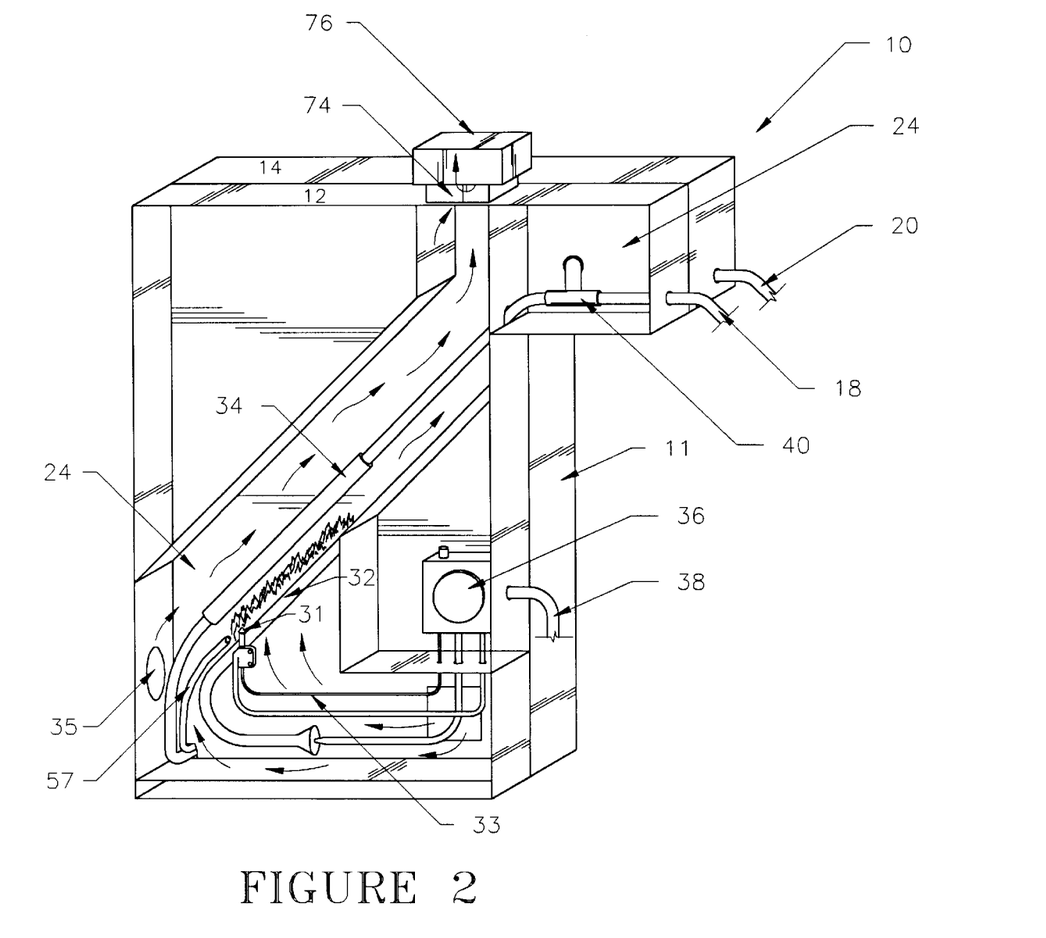
FIG. 2 is a schematic side perspective view of the portable water tank heating system of the present invention with an exterior wall of the housing of the system removed to show internal detail of the hot chamber of the heating system, especially the movement of air therethrough.
Figure 3:
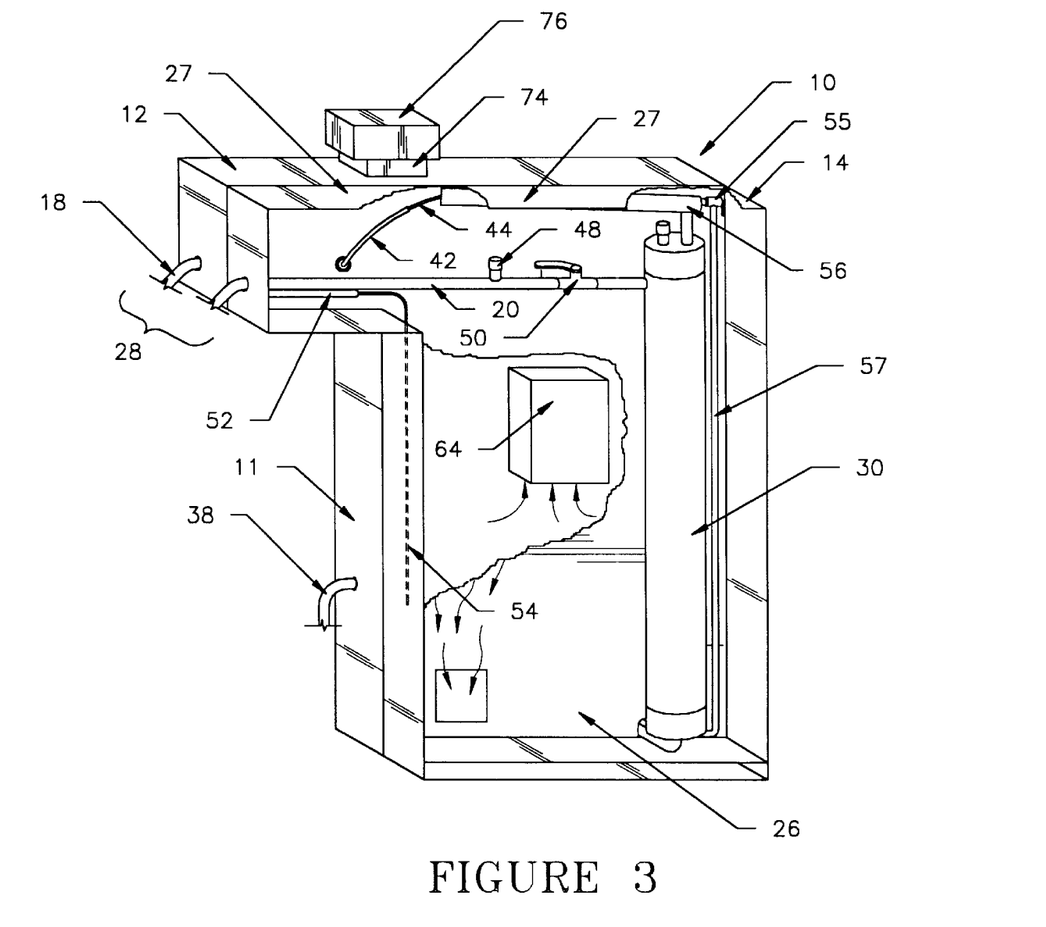
FIG. 3 is a schematic side perspective view of the portable water tank heating system of the present invention with an exterior wall of the housing of the system partially broken away to show internal detail of the cold chamber of the heating system, especially the movement of air therethrough.
Figure 4:
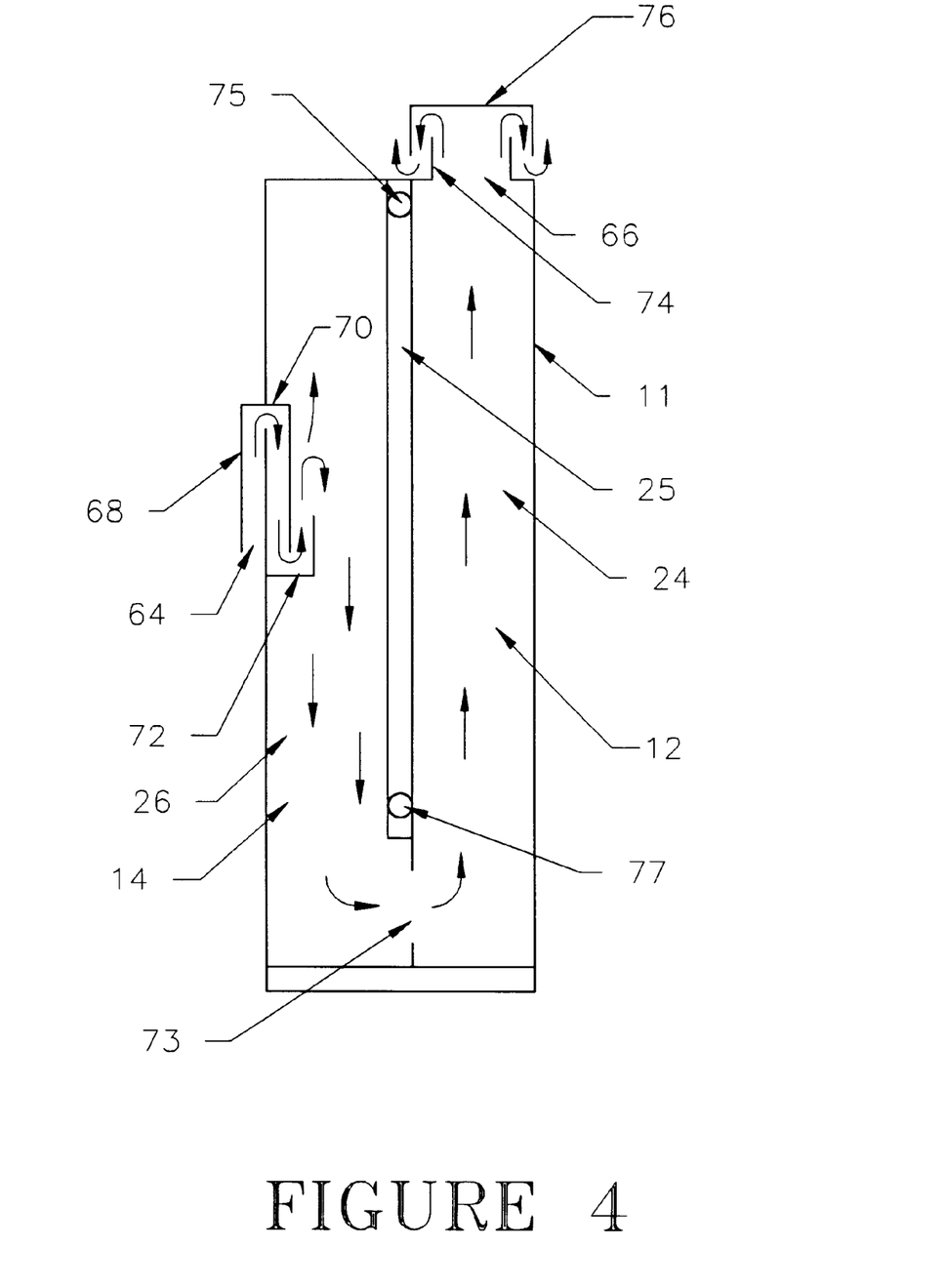
FIG. 4 is a schematic diagrammatical view of the air flow through the interior of the housing of the portable water tank heating system of the present invention, taken approximately along 4—4 of FIG. 1.

More specifically, FIGS. 2–4 illustrate the hot 12 and cold 14 chambers of the housing 11, and also the hot chamber interior 24 and the cold chamber interior 26. The chamber interiors 24, 26 of the chambers 12, 14, have substantially rectangular-box configurations and include suitable shields or baffles mounted therein for maintaining an appropriate air flow through the chamber hot 24 and cold 26 chamber interiors, as will be described below in greater detail.

Figure 5:
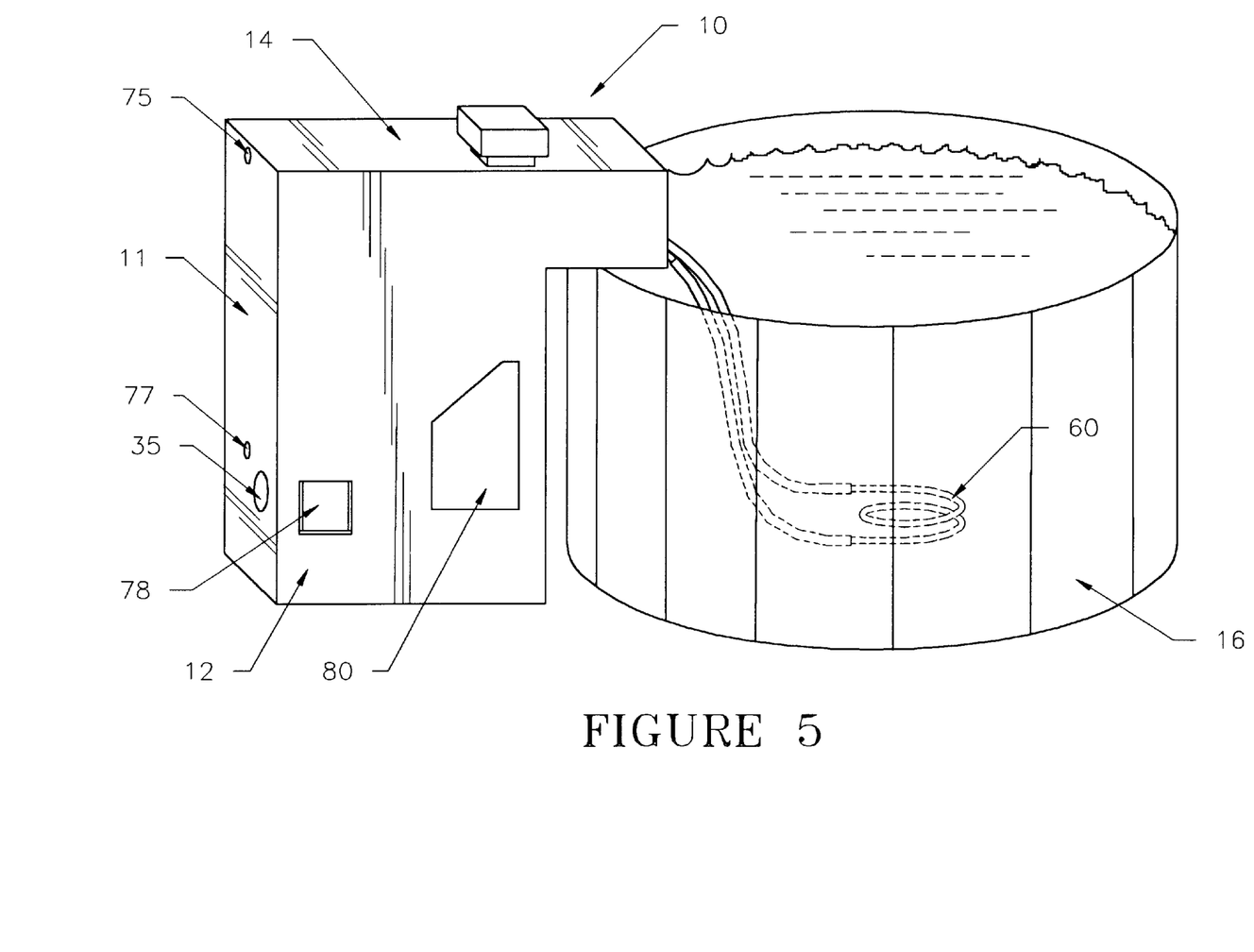
FIG. 5 is a schematic environmental perspective view of the portable water tank heating system of the present invention, particularly illustrating an optional heat exchanger configuration located at the bottom of a drinking tank.

Preferably, an insulating space or gap 25 is located in the housing 11 between the hot 12 and cold 14 chambers. Ideally, an upper vent 75 and a lower vent 77 (see FIGS. 4 and 5) permit the exchange of air between the vented air gap 25 and the outside. Optionally, the insulating gap 25 could be filled with insulation.

The hot outlet line 18 and the cold return line 20 are portions of the continuous closed hollow tubular loop 28 that winds its way through the hot 24 and cold 26 interior chambers. The continuous loop 28 contains a fluid which is circulated therethrough via the hot outlet line 18 by convection to prevent the water in the drinking tank 16 from freezing. The fluid employed should be a liquid having properties suitable for heat transfer and for resistance to freezing in extreme cold weather conditions. The most preferred liquid is a mixture of water and a fluid having anti-freeze characteristics, such as a non-toxic antifreeze used in automobiles, although other suitable fluids may be used.

Cold fluid flows from the heat exchanger 22 in the tank 16 via the cold return line 20 to a reservoir 30 in which the fluid is stored in the cold chamber 14 until needed for recirculation. An elongated gas burner 32 in the hot chamber 12 heats the fluid in the continuous loop 28, as shown in FIG. 2. The burner 32 heats an enlarged tubular portion 34 of the hot outlet line 18. The heated tubular portion 34 of the continuous loop 28 is positioned above and in a substantially parallel relationship with the burner 32. The burner 32 and the tubular portion 34 are most preferably inclined at about a 45 degree angle from the horizontal. The burner 32 is made from a short length of tubing that has been bent to an approximately 45 degree angle with itself, with a plurality of burner orifices therein, and a cap closing the upper end of the tubing. The burner 32 is operatively connected to a gas valve 36 which controls the flow of fuel to the burner 32. A pilot light 31 is located adjacent to the burner 32 for igniting the burner when gas is supplied to the burner. A thermocouple line 33 is also provided between the gas control valve 36 and the pilot light 31. The fuel used in the system 10 is preferably provided from a liquid propane supply 38.

When heat from the burner 32 is applied to the heated tubular portion 34, the fluid inside is heated and expands which increases the pressure in the hot outlet line 18. The fluid flows along the continuous loop 28 and passes through a gas separator 40 having a relatively enlarged cross-sectional area. It is possible that some boiling may occur in the outlet line 18 and some gas or vapor bubbles may be generated by the boiling. (This boiling is most likely to occur at start-up times and under higher temperature ambient conditions.) The function of the gas separator 40 is to remove any vapor or air bubbles that may be present in the outlet line 18. The separator 40 is located at the highest part of the outlet line 18 and is operatively connected by tubing 42 to a small capillary tube 44 and to an expansion tube/vapor condenser unit 56 in fluid communication with the continuous loop 28 through the reservoir 30. The tubes 42 and 44 are small enough so that they do not have a significant effect on fluid flow through the continuous loop 28, but do allow the gas bubbles and water vapor to move through the expansion tube/vapor condenser unit 56 and the reservoir 30 back to the continuous loop 28.

The hot fluid then passes out of the hot chamber 12 via the outlet line 18 into the heat exchanger 22 located in tank 16 to heat the water and prevent it from freezing. The hot outlet line 18 of the continuous loop 28 is submerged in the colder water of the tank 16. The hot fluid flowing into the heat exchanger 22 releases heat to the colder water surrounding the heat exchanger 22 in the tank 16 before the fluid flows back into the cold chamber 14 via the cold return line 20 A drop in the temperature of the fluid present in this portion of the continuous loop is created, and as the hot fluid flows through the heat exchanger 22 and is cooled, a pressure differential is created between the hot 18 and cold 20 portions of the continuous loop 28, which induces a fluid flow through the loop 28 without requiring the use of a pump or other fluid impelling means to move the fluid through the loop.

To regress briefly, the heating of the heated tubular portion 34 and the water therein causes the heated water to expand and move upwardly through the loop 28 to the hot outlet line 18. As the expanded hot fluid leaves the tubular portion 34, the cold fluid enters in at the bottom of the tubular portion 34 from the reservoir 30, replacing the hot fluid that travels along the outlet line 18. When this action occurs, there is a resulting siphoning effect on the return line 20 because of the closed nature of the system 10. Accordingly, when the cold fluid under relatively lower pressure leaves the heat exchanger 22, the fluid is pulled or sucked off into the cold return line 20. The return line 20, which is sloped slightly upwardly to the entrance to the reservoir 30, includes a filling valve 48 and a shutoff valve 50 (preferably comprising a ball-type valve) for use during the initial filling of the continuous loop 28 with fluid, but these valves 48, 50 do not play a part in normal operation of the system.

A temperature sensor 52 is located adjacent to, and preferably in contact with, the return line 20 where it enters the cold chamber interior 26. The preferred temperature sensor 52 is a temperature sensing bulb, which is a relatively thin tube filled with liquid which is readily affected by temperature changes. The sensing bulb 52 is connected by a capillary tube 54 to the gas valve control 36 such that when the temperature of the fluid flowing in the return line 20 is sufficiently high, it will activate the valve control 36 to shut off the fuel to the burner 32, but will leave the pilot light 31 burning. Conversely, the sensor 52 activates the burner 32 (via the gas control valve 36) when the cold fluid returning from the heat exchanger 22 becomes too cold to prevent the water in the tank 16 from freezing.

The flow to and from the reservoir 30 accomplishes two functions: Firstly, the presence of the reservoir 30 applies a suitable amount of back pressure to the fluid in the heated tubular portion 34 of the continuous loop 28, whereby the hot fluid is caused to expand and flow toward the heat exchanger 22 (and the lower pressure present therein), instead of expanding in both directions and flowing back through the cold return line 20. Secondly, the presence of the reservoir 30 assists in increasing the siphoning effect on the return line 20 of the continuous loop 28. The reservoir 30 holds the bulk of the fluid present in the continuous loop 28 of the system 10.

The combined expansion tube/vapor condenser unit 56 is operatively connected to the top of the reservoir 30. The unit 56 provides a place to trap air and vapor bubbles and the like without interfering with the fluid flow in the continuous loop 28. The unit 56 preferably utilizes an adjustable spring and ball type pressure relief valve 55 that is in fluid communication on its outlet side with a pipe 57, with the other end of the pipe 57 being positioned closely adjacent to the pilot light 31 in the hot chamber interior 24. Through this arrangement, a release of excess pressure by the pressure relief valve 55 from the unit 56 blows air through the pipe 57 which extinguishes the pilot light 31 and stops the heating of the tubular portion 34. This relationship reduces the chance of a prolonged buildup of excess fluid or vapor pressure in the continuous loop 28.

Further, the combined expansion tube/vapor condenser unit 56 holds any overflow from the reservoir 30. A further function of the unit 56 is to permit any hot, escaping bubbles of vapor from the gas separator 40 to cool down and condense back into a fluid. The condensed fluid then drains down into the reservoir 30. Ideally, the unit 56 is located closely adjacent to the upper wall 27 of the cold chamber 14 to enhance the cooling of the gas in the unit 56.

After a period of time when the fluid in the return line 20 cools and a thermostat in the gas control valve 36 (connected to the temperature sensor 52) calls for heat, gas is again supplied to the burner 32 and the pilot light 31 will ignite the burner 32 again. The fluid at the end of the cycle in the continuous loop 28 then returns to the reservoir 30 to repeat the operational cycle.

Figure 6:
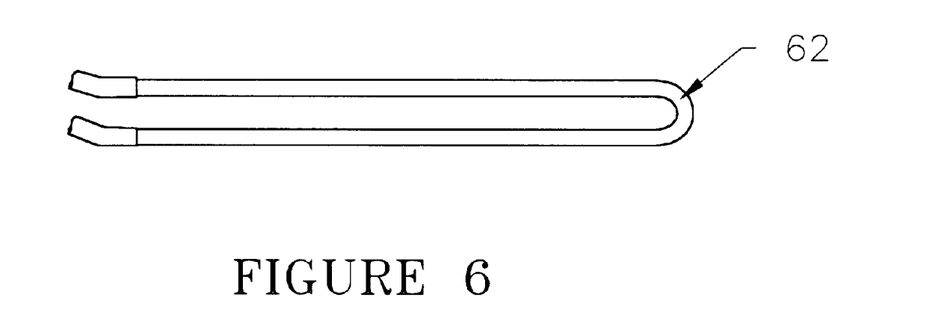
FIGS. 6, 7, 8 and 9 are schematic perspective views of optional heat exchanger configurations for the portable water tank heating system of the present invention.

Referring to FIG. 6, a first embodiment of the heat exchanger 22 for use with the portable water tank heating system 10 is illustrated, namely, a heat exchanger having a single elongated loop arrangement 62. The single loop arrangement 62 is especially efficient when used in conjunction with heating systems of the relatively smallest sizes.

Figure 7:
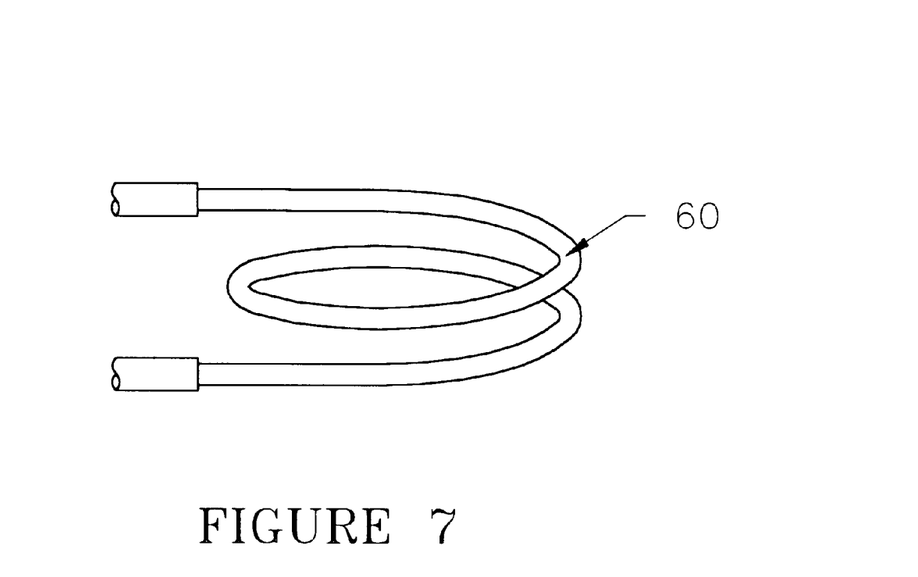

Referring to FIG. 7, a second embodiment of the heat exchanger 22 of the portable water tank heating system 10 is illustrated, namely, a heat exchanger having tubing formed in a spiraled or coiled arrangement 60. The coil arrangement 60 is especially efficient when used in conjunction with heating systems relatively larger than the smallest sizes.

Figure 8:
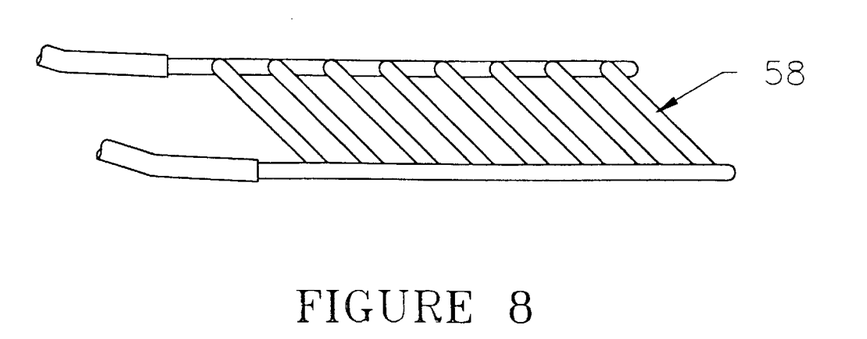

Referring to FIG. 8, a third embodiment of the heat exchanger 22 for use with the portable water tank heating system 10 is illustrated, namely, a heat exchanger having a ladder-type arrangement 58. The ladder-type arrangement 58 is especially efficient when used in conjunction with heating systems of relatively large sizes.

Figure 9:
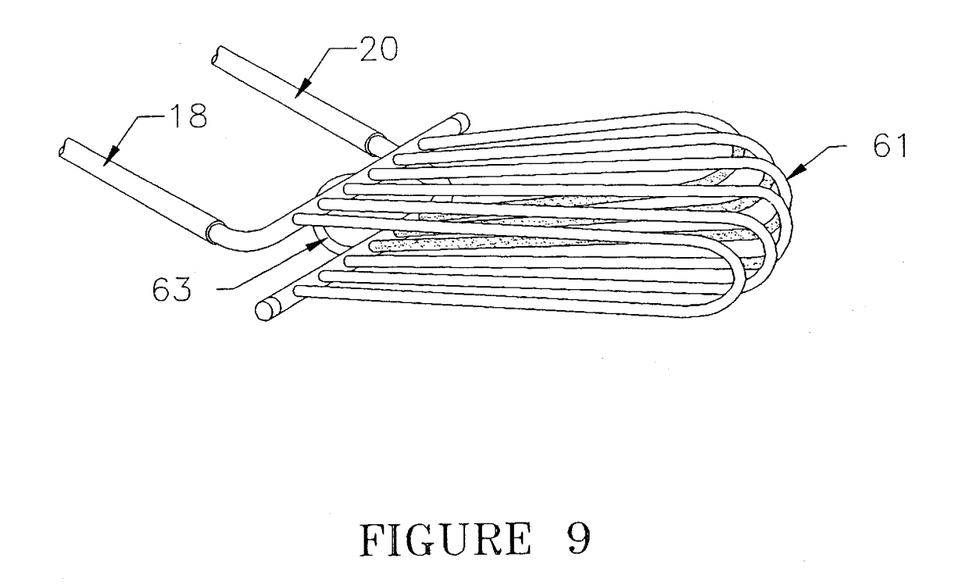
Figure 10:
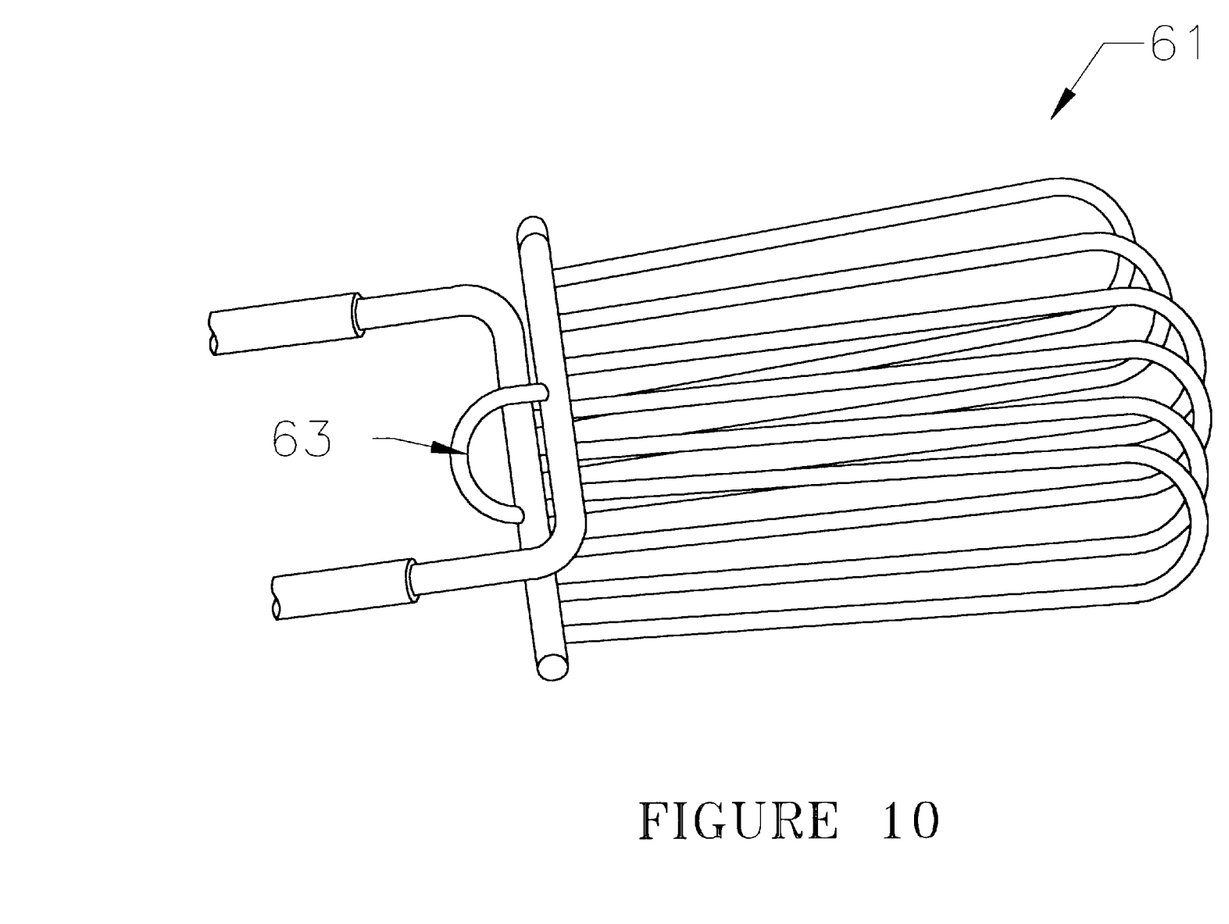
FIG. 10 is a schematic perspective view of the heat exchanger shown in FIG. 9, particularly illustrating the bypass line employed on the heat exchanger.

Referring to FIG. 9, a fourth embodiment of the heat exchanger 22 for use with the portable water tank heating system 10 is illustrated, namely, a heat exchanger having a plurality of curved tubing loops fanning out from first and second manifolds connected to the hot outlet line 18 and the cold return line 20, respectively. The fan-type arrangement 61 is especially efficient when used in conjunction with heating systems of the relatively largest sizes. As best shown in FIG. 10, the fan-type arrangement 61 preferably includes a bypass line 63 between the first and second manifolds which permits a quick movement of some hot fluid between the outlet line 18 and the return line 20. This is beneficial when, for example, the drinking tank is substantially empty and the temperature sensor 52 needs to be triggered by excessively hot fluid in the return line to shut off the burner 32 operation.

The heat exchangers 58, 60, 61, 62 (shown in FIGS. 6–9) may be utilized with a float 23 that moves up and down in the tank 16 as the water level changes, and carries the heat exchanger 22 with it. Use of the float 23 is especially effective in larger capacity water tanks to keep the heat exchanger closer to the water surface where ice is most likely to form. Optionally, the heat exchanger 22 may merely be placed in a stationary position near or on the bottom of the livestock watering tank, which is especially suitable for smaller watering tanks with less water capacity. The size and shape of the heat exchanger in a watering system depends on a number of factors, such as the BTU input required to maintain the water in an unfrozen condition, which dictates the size of the system and its specific application. A lower BTU input can be used in climates that are not as severe. Large systems with relatively large tanks can be used in colder climates. Small systems may be ideal for use by small animals such as dogs, cats and chickens. As noted previously, the system 10 can be made in different physical sizes. A submerged heat exchanger assembly may be ideal for watering horses.

The air flow through the chamber interiors 24 and 26 of the chambers 12 and 14 of the housing 11 is diagramatically illustrated in FIGS. 2, 3 and 4. The path required for air flowing through the hot 12 and cold 14 chambers of the housing is designed to permit sufficient air flow to reach the pilot light 31 and the gas burner 32 while controlling (e.g., minimizing) the velocity of the air reaching the burner, so that the pilot light and the burner stay lit even when high wind conditions exist outside of the system housing 11. The housing 11 has an air inlet passageway 64 formed by a number of baffles and an exhaust passageway 66 which permits sufficient airflow for the burner's operation. The air intake passageway 64 is located on the wall of the cold chamber 14. There is a first baffle 68 on the outside of the cold chamber 14 which prevents the wind from blowing directly into the air intake passageway 64. A second baffle 70 is mounted on the inside of the cold chamber 14 that is structurally similar to the first baffle 68. The third baffle 72 changes the direction of the air flow whereby the air flow is directed upwardly into the cold chamber interior 26. Further, the third baffle 72 acts as a diffuser whereby it spreads the air flow in the upper portion of the cold chamber interior 26. As the speed of the air flow decreases in the cold chamber 14, the air flow will travel to the bottom of the cold chamber 14 and pass through an opening 73 that is substantially the same size as the air inlet passageway 64. Thus, the air flow in the housing is sufficient to maintain the burning operation of the burner 32. Also, the residue of any air is used as secondary air for the burner 32. The air flow continues upwardly in the hot chamber interior 24 and leaves through the top of the housing 11 through a chimney 74 and a chimney cap 76. The chimney 74 and the cap 76 are preferably designed so that the air flows out from all four sides of the chimney 74.

Further, the housing 11 provides separate access to the various parts of the system, such as the pilot light 31 and burner 32. A pilot light access door 78 provides a small access point to the pilot light 31. A control valve access door 80 provides access to the gas control valve 36 without permitting an influx of air to extinguish the pilot light 31. Thus, the protective housing with its baffles assures that the wind is not a problem when lighting the pilot light or accessing other system 10 components. Also, a pilot light viewing window 35 (see FIG. 5) is preferably provided to permit checking of the condition of the pilot light 31 without having to open the pilot light access door 78.

The various parts of the portable water tank heating system 10 of the present invention can be fabricated of any suitable materials. The heated hose in the outlet line 18 and heat exchanger 22 of the continuous loop 28 is maintained by the operation of the propane burner at a relatively lower temperature than conventional electric heaters, which reduces the chances of burning or melting of system components. The instant invention is a working prototype wherein liquid water in a tank has been maintained in a substantially ice-free condition even when the environmental temperature has reached a low of minus 25 degrees Fahrenheit. Further, the use of system 10 has been a substantial time saver in that the task of chopping ice from the surface of the water in the tank has been eliminated.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A portable water tank heating system for preventing the water in a water tank from freezing, comprising:

a protective housing including a hot chamber and a cold chamber adjacent said hot chamber;

a heat exchanger for positioning in the water of a water tank;

a continuous closed tubular loop member being filled with a fluid which circulates by convection therethrough, said loop member being dimensioned and configured to extend between said housing and said heat exchanger positioned in said water tank; said loop member having an outlet line associated with said hot chamber and a return line associated with said cold chamber;

wherein said hot chamber includes:

a gas burner for heating the fluid in said outlet line;

wherein said cold chamber includes:

a reservoir for holding the fluid to be supplied to said outlet line; and a temperature sensor associated with said return line for activating operation of said gas burner when the fluid returning from said heat exchanger is too cold to prevent the water in the water tank from freezing;

wherein said housing has an air inlet path and an air exhaust path therethrough for permitting sufficient air flow through said housing for proper combustion operation of said burner without causing extinguishment of a flame of said burner.

2. The portable water tank heating system according to the claim 1 wherein said burner is supplied with a gaseous fuel.

3. The portable water tank heating system according to claim 1 additionally comprising a gas separator for removing gas bubbles from said outlet line, said gas separator being in fluid communication with said reservoir to permit any gas bubbles removed by said gas separator to flow to said reservoir.

4. The portable water tank heating system according to claim 1 additionally comprising an expansion tube/vapor condenser unit being located above said reservoir and being adapted to hold overflow fluid exiting from said reservoir.

5. The portable water tank heating system according to claim 1 additionally comprising a gas separator in fluid communication with said outlet line for removing gas bubbles from said outlet line, and an expansion tube/vapor condenser unit in fluid communication with said reservoir, wherein said gas separator is in fluid communication with said expansion tube/vapor condenser unit in a manner such that said unit receives gas bubbles from said gas separator and condenses any fluid in gas bubbles removed from the outlet line by said gas separator.

6. The portable water tank heating system according to claim 1, wherein said burner is disposed at an inclined angle with respect to the horizontal plane of said housing.

7. The portable water tank heating system according to claim 6, wherein a portion of said outlet line is oriented substantially parallel to said burner in an inclined position.

8. The portable water tank heating system according to claim 1, further including a float member attached to said heat exchanger to maintain said heat exchanger in a position adjacent to the surface of water held in a water tank.

9. The portable water tank heating system according to claim 1, wherein said heat exchanger has a ladder-type configuration.

10. The portable water tank heating system according to claim 1, wherein said heat exchanger has a spiraled coil configuration.

11. The portable water tank heating system according to claim 1, wherein said heat exchanger comprises a plurality of curved tubular loops extending between first and second manifolds.

* * * * *